United States Patent
Ishida (10) Patent No.: US 11,300,415 B2
(45) Date of Patent: Apr. 12, 2022

(54) HOST VEHICLE POSITION ESTIMATION DEVICE

(71) Applicant: TOYOTA JIDOSHA KABUSHIKI KAISHA, Toyota (JP)

(72) Inventor: Hiroyuki Ishida, Chiryu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 560 days.

(21) Appl. No.: 16/382,857

(22) Filed: Apr. 12, 2019

(65) Prior Publication Data

US 2019/0346273 A1 Nov. 14, 2019

(30) Foreign Application Priority Data

May 9, 2018 (JP) .............................. JP2018-090747

(51) Int. Cl.
  *G01C 21/32* (2006.01)
  *G01C 21/16* (2006.01)
  *G06T 7/70* (2017.01)
  *G01S 5/02* (2010.01)
  *G06T 7/246* (2017.01)

(52) U.S. Cl.
  CPC .......... *G01C 21/32* (2013.01); *G01C 21/165* (2013.01); *G01S 5/0284* (2013.01); *G06T 7/246* (2017.01); *G06T 7/70* (2017.01); *G06T 2207/30244* (2013.01); *G06T 2207/30256* (2013.01)

(58) Field of Classification Search
  None
  See application file for complete search history.

(56) References Cited

U.S. PATENT DOCUMENTS

| 9,098,751 | B2* | 8/2015 | Hilldore | G06K 9/00798 |
| 9,784,843 | B2* | 10/2017 | Dolinar | G06K 9/6278 |
| 9,884,623 | B2* | 2/2018 | Fasola | B60W 30/12 |
| 10,179,543 | B2* | 1/2019 | Rathi | G06K 9/00805 |
| 10,331,957 | B2* | 6/2019 | Kwant | G06K 9/00798 |

FOREIGN PATENT DOCUMENTS

| JP | 2005-291732 A | 10/2005 |
| JP | 2013-104861 A | 5/2013 |

* cited by examiner

*Primary Examiner* — Jonathan M Dager
*Assistant Examiner* — Garrett F Evans
(74) *Attorney, Agent, or Firm* — Sughrue Mion, PLLC (57) ABSTRACT

A host vehicle position estimation device includes a target recognition unit configured to recognize a relative position of the vertical position target relative to a host vehicle on the basis of a detection result of an external sensor of the host vehicle, an amount-of-position error calculation unit configured to calculate an amount of position error, an amount-of-steady error calculation unit configured to calculate an amount of steady error from a distribution of the amount of position error when it is determined that the distribution of the amount of position error satisfies a steady condition, and a host vehicle position estimation unit configured to perform estimation of a vertical position of the host vehicle using the amount of steady error when the relative position of the vertical position target relative to the host vehicle is not recognized.

4 Claims, 5 Drawing Sheets

HOST VEHICLE POSITION ESTIMATION DEVICE

TECHNICAL FIELD

The present disclosure relates to a host vehicle position estimation device.

CROSS-REFERENCE TO RELATED APPLICATION

This application claims the benefit of priority from Japanese Patent Application No. 2018-090747, filed May 9, 2018, the entire contents of which are incorporated herein by reference.

BACKGROUND

In the related art, Japanese Unexamined Patent Publication No. 2013-104861 is known as a technical document regarding a host vehicle position estimation device. This publication describes a device that extracts a feature point such as a corner point from an image obtained by imaging front or rear of a host vehicle, and corrects a host vehicle position on the basis of the extracted feature point and a registered feature point at which a position on a map has been registered in advance.

SUMMARY

In the prior art described above, it is shown that a host vehicle position is corrected in an environment in which feature points can be extracted. However, feature points cannot always be extracted while the host vehicle is traveling. Therefore, even when the feature points cannot be extracted, high accuracy of a position of the host vehicle is required.

In order to solve the above problem, one aspect of the present disclosure is a host vehicle position estimation device that estimates a host vehicle position including a vertical position of a host vehicle, the host vehicle position estimation device including: a target database configured to store position information on a map of a plurality of vertical position targets disposed along an extending direction of a lane; a target recognition unit configured to recognize a relative position of the vertical position target relative to the host vehicle on the basis of a detection result of an external sensor of the host vehicle; an amount-of-position error calculation unit configured to calculate an amount of position error on the basis of a correlation between the position information on the map of a plurality of vertical position targets and the relative positions of the plurality of vertical position targets; a steady condition determination unit configured to determine whether or not a distribution of the amount of position error calculated by the amount-of-position error calculation unit satisfies a preset steady condition; an amount-of-steady error calculation unit configured to calculate an amount of steady error from the distribution of the amount of position error when the steady condition determination unit determines that the distribution of the amount of position error satisfies the steady condition; and a host vehicle position estimation unit configured to perform estimation of the vertical position of the host vehicle using the amount of steady error when the relative position of the vertical position target relative to the host vehicle is not recognized by the target recognition unit.

According to the host vehicle position estimation device according to one aspect of the present disclosure, the amount of steady error generated steady in position estimation of the host vehicle due to a sensor error or the like is obtained from the correlation between the relative position of the vertical position target and the position information on the map of the vertical position target while the relative position of a plurality of vertical position targets disposed along an extending direction of a lane can be recognized, and the amount of steady error is used for estimation of the vertical position of the host vehicle when the relative position of the vertical position target cannot be recognized. Thus, it is possible to improve the accuracy of estimation of the vertical position of the host vehicle in a section in which there is no vertical position target as compared with a case in which the amount of steady error is not used.

In the host vehicle position estimation device according to one aspect of the present disclosure, the amount-of-position error calculation unit may acquire vehicle speed information of the host vehicle at the time of calculation of the amount of position error, the amount-of-steady error calculation unit may calculate a reference vehicle speed, which is a vehicle speed corresponding to the amount of steady error, from the vehicle speed information acquired by the amount-of-position error calculation unit, and when the relative position of the vertical position target relative to the host vehicle is not recognized by the target recognition unit, the host vehicle position estimation unit may perform estimation of the vertical position of the host vehicle using an amount of error correction obtained by multiplying the amount of steady error by a vehicle speed ratio obtained by dividing a current vehicle speed of the host vehicle by the reference vehicle speed.

In the host vehicle position estimation device according to one aspect of the present disclosure, the vertical position target may be a line segment of a dotted lane marking line.

According to one aspect of the present disclosure, it is possible to improve accuracy of estimation of the vertical position of the host vehicle in a section in which there is no vertical position target.

DETAILED DESCRIPTION

Hereinafter, embodiments of the present disclosure will be described with reference to the drawings.

Figure 1:
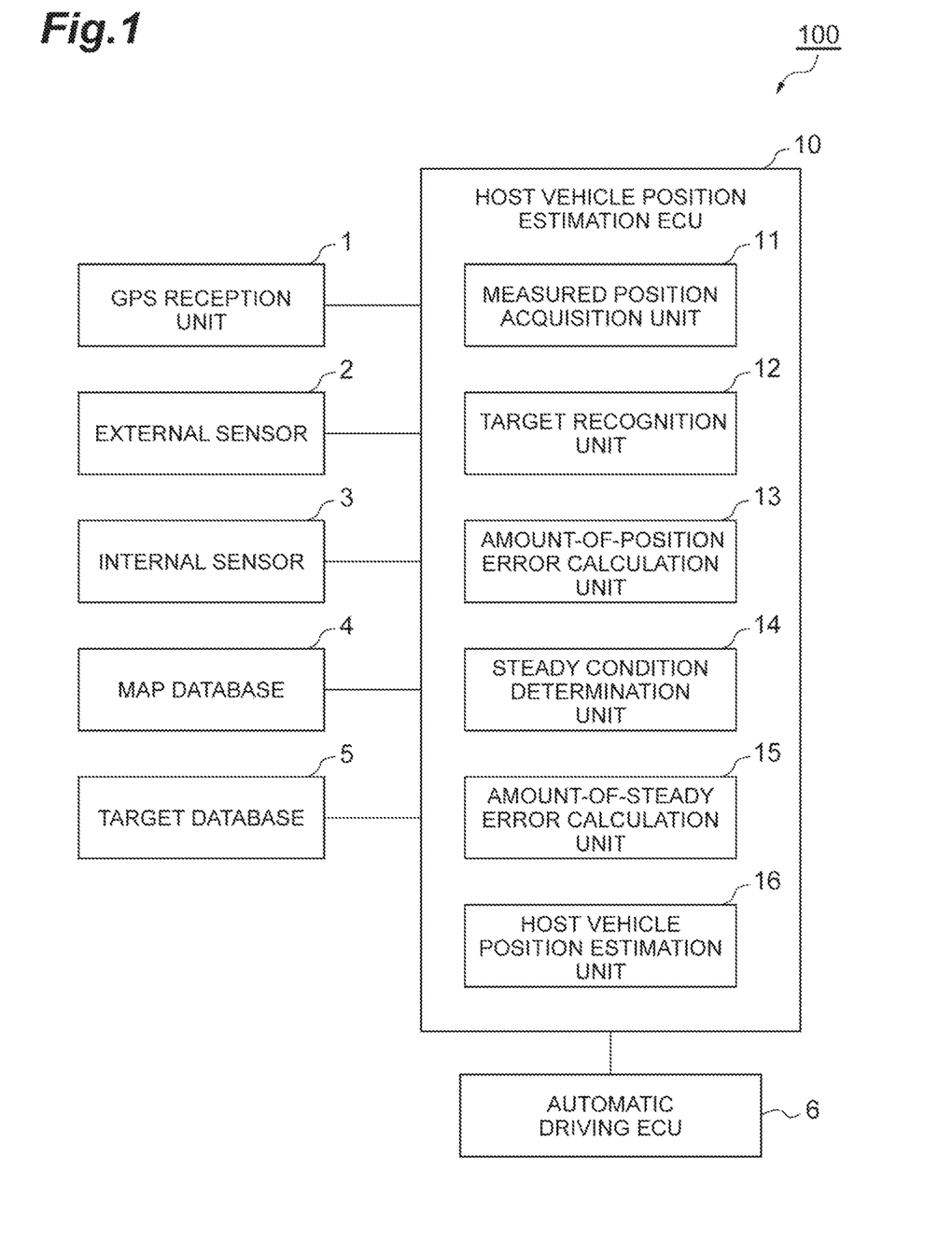
FIG. 1 is a block diagram illustrating a host vehicle position estimation device according to an embodiment.

FIG. 1 is a block diagram illustrating a host vehicle position estimation device according to an embodiment. The host vehicle position estimation device 100 illustrated in FIG. 1 is a device that is mounted in a vehicle (host vehicle) such as a car and estimates a host vehicle position which is a position on a map of the host vehicle. The host vehicle position estimation device 100 estimates a vertical position of the host vehicle which is a position on the map in an extending direction of a travel lane on which the host vehicle is traveling. The host vehicle position estimation device 100 estimates the vertical position using a vehicle speed of the host vehicle.

[Configuration of Host Vehicle Position Estimation Device]

As illustrated in FIG. 1, the host vehicle position estimation device 100 includes a host vehicle position estimation electronic control unit (ECU) 10 that comprehensively manages a system. The host vehicle position estimation ECU 10 is an electronic control unit including a central processing unit (CPU), a read only memory (ROM), a random access memory (RAM), a controller area network (CAN) communication circuit, and the like. In the host vehicle position estimation ECU 10, various functions are realized, for example, by loading a program stored in the ROM into the RAM and executing the program loaded in the RAM, in the CPU. The host vehicle position estimation ECU 10 may include a plurality of electronic units.

The host vehicle position estimation ECU 10 is connected to a GPS reception unit 1, an external sensor 2, an internal sensor 3, a map database 4, a target database 5, and an automatic driving ECU 6.

The GPS reception unit 1 is a measurement unit configured to measure a position of the host vehicle on the map (for example, a latitude and longitude of the host vehicle) by receiving signals from three or more GPS satellites. The GPS reception unit 1 transmits the measured position information of the host vehicle to the host vehicle position estimation ECU 10.

The external sensor 2 is a detection device (an in-vehicle sensor) that is mounted in the host vehicle and detects a situation around the host vehicle. The external sensor 2 includes at least one of a camera and a radar sensor.

The camera is an imaging device that images an external situation of the host vehicle. The camera is provided on the back side of a windshield of the host vehicle. The camera transmits a captured image regarding the external situation of the host vehicle to the host vehicle position estimation ECU 10. The camera may be a monocular camera or may be a stereo camera. The camera may be provided to image the side of the host vehicle.

A radar sensor is a detection device that detects an object near the host vehicle using radio waves (for example, millimeter waves) or light. Examples of the radar sensor include millimeter wave radar or light detection and ranging (ridar). The radar sensor transmits radio waves or light to surroundings of the host vehicle and receives radio waves or light reflected by an object to detect the object. The radar sensor transmits the detected object information to the host vehicle position estimation ECU 10. The radar sensor may include a plurality of sensors including both a millimeter wave radar and a rider. The radar sensor may be provided to detect an object on the side of the host vehicle. The radar sensor may be capable of detecting lane marking lines.

The internal sensor 3 is a detection device that detects a traveling state of the host vehicle. The internal sensor 3 includes a vehicle speed sensor, an acceleration sensor, and a yaw rate sensor. The vehicle speed sensor is a detector that detects a speed of the host vehicle. As the vehicle speed sensor, for example, a wheel speed sensor that is provided for a wheel of the host vehicle or a drive shaft that rotates integrally with the wheel, or the like and detects a rotation speed of the wheel is used. The vehicle speed sensor transmits detected vehicle speed information (wheel speed information) to the host vehicle position estimation ECU 10.

The acceleration sensor is a detector that detects an acceleration of the host vehicle. The acceleration sensor includes, for example, a longitudinal acceleration sensor that detects an acceleration in a longitudinal direction of the host vehicle, and a lateral acceleration sensor that detects a lateral acceleration of the host vehicle. The acceleration sensor, for example, transmits acceleration information of the host vehicle to the host vehicle position estimation ECU 10. The yaw rate sensor is a detector that detects a yaw rate (a rotational angular velocity) around a vertical axis of a centroid of the host vehicle. As the yaw rate sensor, for example, a gyro sensor can be used. The yaw rate sensor transmits detected yaw rate information of the host vehicle to the host vehicle position estimation ECU 10.

The map database 4 is a database configured to store map information. The map database 4 is formed, for example, in a hard disk drive (HDD) mounted in the host vehicle. The map information may include position information on a road (position information of a lane), road shape information (for example, a curve, a type of a straight section of a road, a curvature, or the like), position information of an intersection and a branch point, and the like. The map database 4 may be formed in a server capable of communicating with the host vehicle.

The target database 5 is a database configured to store target information on the target. The target is an object of which position information on the map is known and is used as a reference of the host vehicle position estimation. The target includes a lane marking line of the lane. The target information includes feature information for specifying the target, and position information on the map.

The target according to the embodiment includes a vertical position target. The vertical position target is a target used for estimation of the vertical position of the host vehicle. For the vertical position target, a plurality of targets disposed along an extending direction of a lane can be used. Specifically, the vertical position target includes a line segment of a dotted lane marking line. The dotted lane marking line is a lane marking line formed as a dotted line composed of intermittent line segments among lane marking lines such as a lane boundary line extending along the lane. A lane marking line formed as continuous solid lines without interruption among the lane marking lines is referred to as a solid lane marking line.

Specifically, it is possible to use an end portion (an end portion in the extending direction of the lane marking line) of each line segment of the dotted lane marking line as the vertical position target. A line segment itself of the dotted lane marking line may be used as the vertical position target. Further, the vertical position target may include a plurality of poles aligned along an extending direction of the lane, or may include a plurality of leg portions of guardrails aligned along the extending direction of the lane.

The target database 5 is not necessarily mounted in the host vehicle and may be formed in a server capable of communicating with the host vehicle. Further, the target database 5 may be configured as a database integral with the map database 4. In this case, the target information may be integrated with the map information of the map database 4.

The automatic driving ECU 6 is an electronic control unit that is mounted in the host vehicle and executes automatic driving of the host vehicle. The automatic driving is host vehicle control that causes the host vehicle to travel automatically without a driver performing a driving manipulation. The automatic driving ECU 6 may include a plurality of electronic units. Some of the functions of the automatic driving ECU 6 may be executed by a server capable of communicating with the host vehicle.

The automatic driving ECU 6 recognizes a surrounding environment of the host vehicle (such as a position of other vehicle around the host vehicle) on the basis of a detection result of the external sensor 2. The automatic driving ECU 6 recognizes a host vehicle state such as a vehicle speed or a yaw rate on the basis of the detection result of the internal sensor 3. The automatic driving ECU 6 generates a travel plan along a preset target route on the basis of the host vehicle position estimated by the host vehicle position estimation device 100, the map information in the map database 4, the surrounding environment of the host vehicle, and the host vehicle state. The target route may be manually set by an occupant of the host vehicle or may be automatically set by a known navigation system or the automatic driving ECU 6.

The automatic driving ECU 6 executes automatic driving according to a travel plan. The automatic driving ECU 6 transmits a control signal to an actuator (an engine actuator, a steering actuator, a brake actuator, or the like of the host vehicle) to execute automatic driving. The automatic driving ECU 6 can perform generation of a travel plan and execution of automatic driving using a known method. The host vehicle position estimation ECU 10 is not necessarily connected to the automatic driving ECU 6.

Next, a functional configuration of the host vehicle position estimation ECU 10 will be described. The host vehicle position estimation ECU 10 includes a measured position acquisition unit 11, a target recognition unit 12, an amount-of-position error calculation unit 13, a steady condition determination unit 14, the amount-of-steady error calculation unit 15, and a host vehicle position estimation unit 16.

The measured position acquisition unit 11 acquires a measured position that is a position on the map of the host vehicle on the basis of the position information of the host vehicle measured by the GPS reception unit 1. The measured position acquisition unit 11 acquires the measured position as information of latitude and longitude, for example. Further, the measured position acquisition unit 11 estimates the vertical position in the extending direction of the traveling lane of the host vehicle among the measured positions of the host vehicle on the basis of the detection result (vehicle speed information) of the internal sensor 3.

The target recognition unit 12 determines whether or not a relative position of the vertical position target relative to the host vehicle has been recognized on the basis of the detection result of the external sensor 2. The relative position of the vertical position target relative to the host vehicle is the relative position of the vertical position target with reference to the host vehicle. As an example, the target recognition unit 12 narrows down a candidate for the vertical position target detected by the external sensor 2 of the host vehicle from the target information of the target database 5 using the measured position of the host vehicle measured by the measured position acquisition unit 11, and recognizes the vertical position target present around the host vehicle from the detection result of the external sensor 2 and the feature information of the candidate for the vertical position target. The target recognition unit 12, for example, can recognize a vertical position target such as a dotted lane marking line by performing image processing such as Edge extraction, Hough transformation and Pattern matching on the captured image of the camera. The target recognition unit 12 recognizes the relative position of the recognized vertical position target relative to the host vehicle.

The target recognition unit 12 does not have to constantly use the measured position of the host vehicle, and when host vehicle position estimation has already been performed, the host vehicle position estimated in the past (for example, one before) may be used instead. A relative position of the vertical position target may be recognized from the captured image of the camera of the external sensor 2, may be recognized from object information of the radar sensor, or may be recognized from both the captured image and the object information. A method of recognizing the relative position of the vertical position target is not limited, and various schemes can be adopted.

The amount-of-position error calculation unit 13 calculates the amount of position error on the basis of the correlation between the position information of the plurality of vertical position targets on the map and the relative position of the plurality of vertical position targets. For example, a plurality of vertical position target means not only one of line segments constituting the dotted lane marking line, but also a group of a plurality of line segments constituting the dotted lane marking line, which are used for calculation.

The correlation between the position information of the plurality of vertical position targets on the map and the relative position of the plurality of vertical position targets means an entire relative relationship between the position information of the plurality of vertical position targets on the map and the relative position of the plurality of vertical position targets. In the amount-of-position error calculation unit 13, the plurality of vertical position targets are not individually overlapped and the plurality of vertical position targets are overlapped together.

The amount of position error corresponds to a degree of divergence of the extending direction of the lane between the position information of the plurality of vertical position targets on the map and the relative position of the plurality of vertical position targets when the position information of the plurality of vertical position targets on the map and the relative position of the plurality of vertical position targets are overlapped to most match each other. The amount of position error becomes zero when the position information of the plurality of vertical position targets on the map and the relative position of the plurality of vertical position targets completely match.

Specifically, the amount-of-position error calculation unit 13 performs projection and combination with reference to the position of the host vehicle on the basis of the captured image of the camera, to generate a recognized road surface image including the plurality of vertical position targets recognized by the target recognition unit 12. The recognized road surface image can be a road surface image in plan view in which the host vehicle is viewed from above.

The amount-of-position error calculation unit 13 stores a result of generating the recognized road surface image generated at a previous time. The amount-of-position error calculation unit 13 moves the previous recognized road surface image in parallel in a progression direction of the host vehicle by a distance corresponding to the movement of the host vehicle from previous generation. This parallel movement amount is "vehicle speed"דdifference of time from a previous generation time". In this case, for example, since an error is included in the vehicle speed of the host vehicle detected by the vehicle speed sensor, corresponding distortion is accumulated in the recognized road surface image. A cause of such distortion is not limited to the vehicle speed error, and an error of a time value due to a system delay may be considered.

The amount-of-position error calculation unit 13 moves the previous recognized road surface image in parallel with reference to the position of the host vehicle and projects the plurality of vertical position targets of which relative positions with respect to the host vehicle is recognized by the target recognition unit 12, to generate a new recognized road surface image.

Further, the amount-of-position error calculation unit 13 generates a map corresponding road surface image including a pseudo dotted lane marking line from the map information and the position information of the plurality of vertical position targets on the map by referring to the measured position of the host vehicle acquired by the measured position acquisition unit 11. The amount-of-position error calculation unit 13 obtains a correlation between the recognized road surface image and the map corresponding road surface image. The amount-of-position error calculation unit 13 performs overlapping so that the plurality of vertical position targets in the recognized road surface image match the vertical position target in the map corresponding road surface image. The amount-of-position error calculation unit 13 calculates, as the amount of position error, a degree of divergence of the plurality of vertical position targets when the plurality of vertical position targets in the recognized road surface image and the vertical position target in the map corresponding road surface image are overlapped to most match each other. The degree of divergence can be, for example, a maximum value of the amount of deviation (a vertical separation distance on the image) between the plurality of vertical position targets which cannot be matched to each other.

Figure 2:
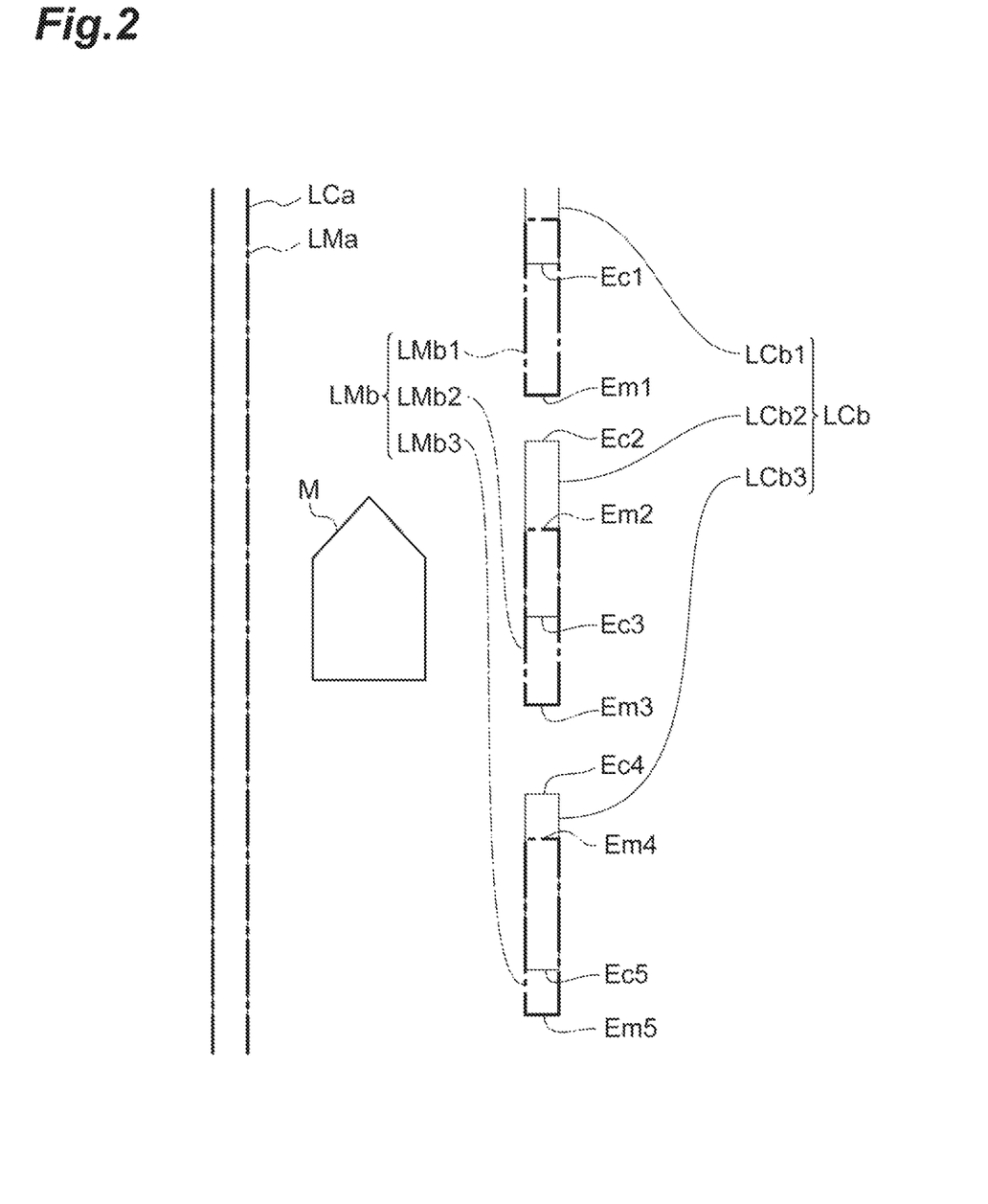
FIG. 2 is a plan view illustrating a situation in which a steady vertical position error is generated.

Here, FIG. 2 is a plan view illustrating a situation in which a steady vertical position error is generated. The steady vertical position error is generated due to, for example, an error of the vehicle speed sensor of the host vehicle. FIG. 2 illustrates a host vehicle C, a solid lane marking line LCa on the left side in a recognized road surface image, a solid lane marking line LMa on the left side (a pseudo solid lane marking line) in a map corresponding road surface image, a dotted lane marking line LCb on the right side in the recognized road surface image, and a dotted lane marking line LMb (a pseudo dotted lane marking line) on the right side in the map corresponding road surface image. The solid lane marking line is not a vertical position target.

In FIG. 2, the dotted lane marking line LCb includes a line segment LCb1, a line segment LCb2, and a line segment LCb3. The dotted lane marking line LMb includes a line segment LMb1, a line segment LMb2, and a line segment LMb3. Further, FIG. 2 illustrates a rear end Ec1 of the line segment LCb1, a front end Ec2 of the line segment LCb2, a rear end Ec3 of the line segment LCb2, a front end Ec4 of the line segment LCb3, a rear end Ec5 of the line segment LCb3, a rear end Em1 of the line segment LMb1, a front end Em2 of the line segment LMb2, a rear end Em3 of the line segment LMb2, a front edge Em4 of the line segment LMb3, and a rear edge Em5 of the line segment LMb3.

In the situation illustrated in FIG. 2, the amount-of-position error calculation unit 13 performs overlapping so that the dotted lane marking line LCb on the right side in the recognized road surface image matches the dotted lane marking line LMb on the right side in the map corresponding road surface image. Specifically, the amount-of-position error calculation unit 13 performs overlapping so that the line segment LCb1, the line segment LCb2, and the line segment LCb3 of the dotted lane marking line LCb match the line segment LMb1, the line segment LMb2, and the line segment LMb3 of the dotted lane marking line LMb. Since the solid lane marking line LCa is not the vertical position target, the amount-of-position error calculation unit 13 does not use the solid lane marking line LCa for calculation of the amount of position error for vertical position estimation. The amount-of-position error calculation unit 13 may use the solid lane marking line LCa on the left side in the recognized road surface image and the solid lane marking line LMa on the left side in the map corresponding road surface image when the line segments overlap in a width direction (a lateral direction) of the lane.

The amount-of-position error calculation unit 13 calculates the amount of deviation between the dotted lane marking line LCb and the dotted lane marking line LMb when the dotted lane marking lines most match each other, as the amount of position error. The amount-of-position error calculation unit 13, for example, calculates a separation distance of the rear end Ec1 of the line segment LCb1 and the rear end Em1 of the line segment LMb1 in the extending direction of the lane when the line segments overlap to be most match each other. The amount-of-position error calculation unit 13 similarly calculates the separation distance, for example, for the front end Ec2 of the line segment LCb2 and the front end Em2 of the line segment LMb2. As one example, the amount-of-position error calculation unit 13 calculates a maximum value of a separation distance of each end portion as the amount of position error. The amount-of-position error calculation unit 13 may calculate the average value of the separation distance of each end portion as the amount of position error. The amount-of-position error calculation unit 13 calculates, for example, the amount of position error each time the recognized road surface image is generated.

The amount-of-position error calculation unit 13 may use the following idea with respect to the correlation between a plurality of vertical position targets of the recognized road surface image and the vertical position target of the map corresponding road surface image. In this respect, a technology described in "Takafumi Aoki et al., "High Accuracy Machine Vision based on Phase-Only Correlation Method—Toward Image Sensing Technology Beyond Wall of Pixel Resolution", IEICE Fundamentals Review, vol. 1, no. 1, p. 30-40, 2007" can be used.

Specifically, when the recognized road surface image G(i, j) is in a relationship in which the recognized road surface image G(i, j) is translated from the map corresponding road surface image F(i+j) to ($\Delta i$, $\Delta j$) [pix], and G(i, j)=F(i+$\Delta i$, j+$\Delta j$), a frequency component thereof is expressed by Equation (1) below. i and j correspond to a biaxial orthogonal coordinate system in the image.

[Equation 1]

$$G(u, v) = \sum_{i,j} f(i + \Delta i, j + \Delta j) e^{-\frac{2\pi i(iu+jv)}{N}} \quad (1)$$

$$= \sum_{i+\Delta i, j+\Delta j} f(i + \Delta i, j + \Delta j)$$

$$e^{-\frac{2\pi i[(i+\Delta i)u+(j+\Delta j)v]}{N}} e^{\frac{2\pi i(\Delta i u + \Delta j v)}{N}}$$

$$= F(u, v) e^{\frac{2\pi i(\Delta i u + \Delta j v)}{N}}$$

In this case, a spatial frequency component of a correlation image of the recognized road surface image G(i, j) and the map corresponding road surface image F(i, j) is expressed by Equation (2) below.

[Equation 2]

$$H(u, v) = \frac{F(u, v) \cdot \overline{F(u, v) e^{2\pi i(\Delta i u + \Delta j v)/N}}}{|F(u, v) \cdot \overline{F(u, v) e^{2\pi i(\Delta i u + \Delta j v)/N}}|} = e^{-2\pi i(\Delta i u + \Delta j v)/N} \quad (2)$$

From this, the correlation image is obtained using Equation (3) below through two-dimensional inverse fast Fourier transform (FFT).

[Equation 3]

$$h(i, j) = \sum_{u,v} e^{-\frac{2\pi i(\Delta i u + \Delta j v)}{N}} e^{\frac{2\pi i(i u + j v)}{N}} \quad (3)$$

$$= \delta(\Delta i, \Delta j) = \begin{cases} 1, & i = -\Delta i \text{ and } j = -\Delta j \\ 0, & \text{otherwise} \end{cases}$$

Accordingly, the amounts of position error ($-\Delta i$, $-\Delta j$) can be calculated.

Further, the amount-of-position error calculation unit 13 acquires the vehicle speed information of the host vehicle at the time of calculation of the amount of position error on the basis of the detection result of the internal sensor 3. The amount-of-position error calculation unit 13 associates the calculated amount of position error with the vehicle speed information of the host vehicle at the time of calculation.

The steady condition determination unit 14 determines whether or not a distribution of the amount of position error calculated by the amount-of-position error calculation unit 13 satisfies a preset steady condition. The distribution of the amount of position error is a variation in the amount of position error for a plurality of times calculated by the amount-of-position error calculation unit 13. The number of amounts of position error that are used for the distribution of the amount of position error may be equal to or greater than five, may be equal to or greater than ten, or may be equal to or greater than 20. The number of amounts of position error that are used for the distribution of the amount of position error is preset.

The steady condition is a condition for determining whether or not the amount of position error equal to or larger than a certain amount is a steady error. The steady error is an error generated steady when the host vehicle is traveling due to an error of the vehicle speed sensor, a process delay of the host vehicle position estimation ECU 10, an error of the GPS reception unit 1, or the like.

For example, when the standard deviation in the amount of position error equal to or greater than a determination target threshold value among the amounts of position error for a plurality of times is equal to or smaller than the variation threshold value, the steady condition determination unit 14 can determine that the distribution of the amount of position error satisfies the steady condition. The determination target threshold value is a preset threshold value which is a target of a determination of the steady error. The variation threshold value is a preset threshold value for determining a variation.

Specifically, for example, when the position information of the plurality of vertical position targets on the map and the relative position of the plurality of vertical position targets substantially match (when the vertical position of the host vehicle is accurately estimated), the distribution of the amount of position error gathers in the vicinity of zero in the steady condition determination unit 14. In this case, since all the amounts of position error are smaller than the determination target threshold value, the steady condition is not satisfied.

Further, when the amount of position error is generated due to an external factor such as non-updating of the map information even though the position of the vertical position target (for example, the dotted lane marking line) has been changed due to road construction or the like is considered. Here, FIG. 3 is a plan view illustrating a situation in which the relative position of an actual lane marking line and the position information of the lane marking line on the map do not match.

Figure 3:
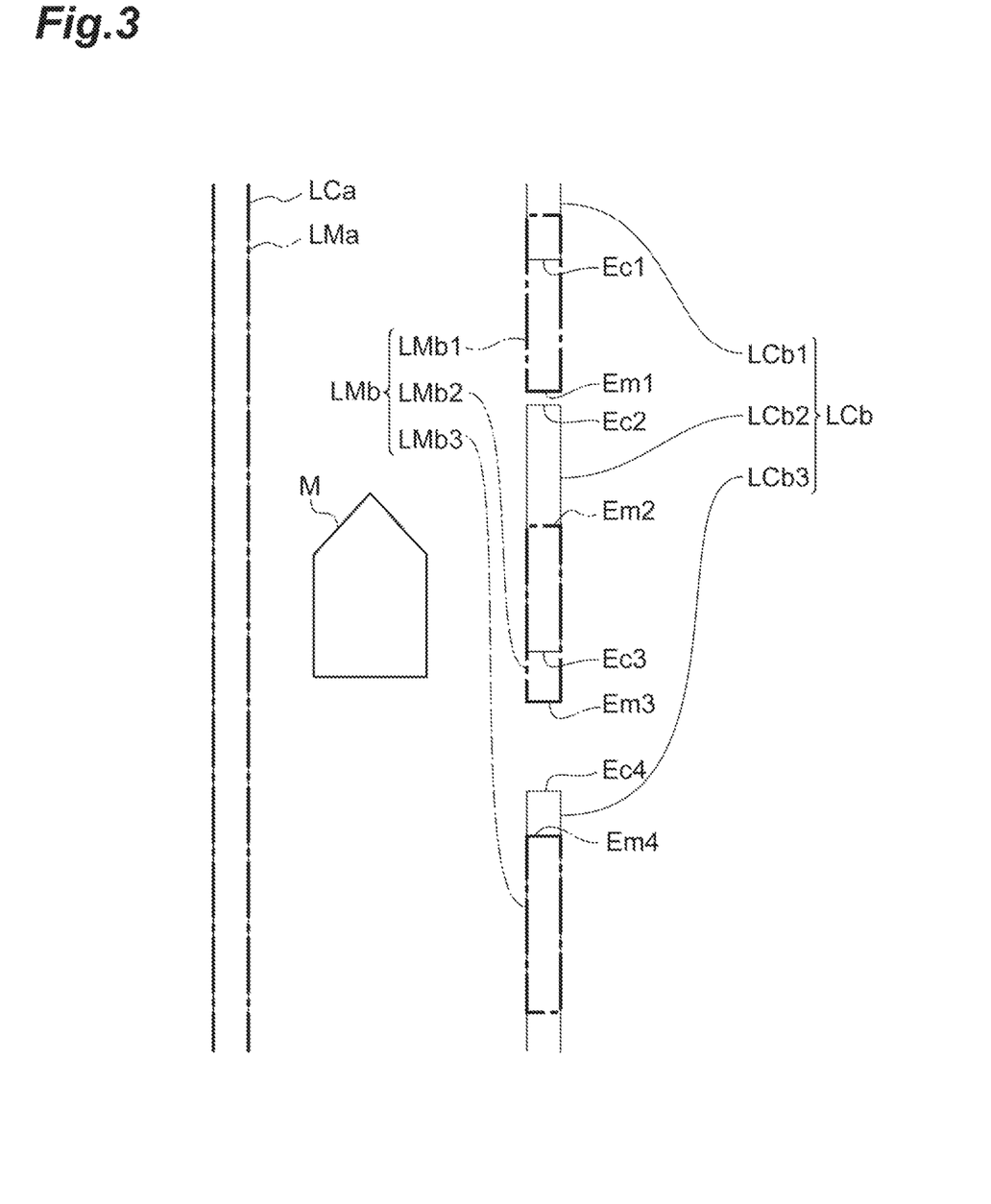
FIG. 3 is a plan view illustrating a situation in which a relative position of an actual lane marking line and position information of a lane marking line on a map do not match.

In FIG. 3, the dotted lane marking line on the right side of the host vehicle M is repainted through road construction, and a length or position of the line segment are changed. In FIG. 3, the dotted lane marking line LCb on the right side in the recognized road surface image recognizes the dotted lane marking line after repainting. On the other hand, since the map information is not updated and the dotted lane marking line LMb on the right side in the map corresponding road surface image is old, a length and position of the line segment do not match the dotted lane marking line LCb. In this case, since a position of an actual vertical position target and the position information of the vertical position target on the map are different from each other, the plurality of amounts of position error may be equal to or larger than the determination target threshold value. However, since a distribution of the amount of position error due to such an external factor becomes nonuniform, a distribution (a standard deviation) of the amount of position error exceeds the variation threshold value. Therefore, the steady condition is not satisfied. Thus, the variation threshold value can be appropriately set from the viewpoint of suppression of the false recognition of the amount of position error caused by repainting of the dotted lane marking line through road construction as a steady error.

On the other hand, when the amount of position error is generated steady due to the error of the vehicle speed sensor as illustrated in FIG. 2, the steady condition determination unit 14 determines whether the standard deviation in the amount of position error equal to or greater than the determination target threshold value among the amounts of position error for a plurality of times is equal to or smaller than the variation threshold value, and the steady condition is satisfied. The steady condition determination unit 14 can determine that a constant amount of position error (the amount of position error away from zero) is generated steady.

The steady condition determination unit 14 can determine whether or not the steady condition is satisfied using another scheme. For example, when the amount of position error is x and the peak of the plurality of amounts of position error (the amount of position error most away from zero from zero) is xp, the steady condition determination unit 14 determines that the steady condition is satisfied in if Equation 4 below is satisfied.

[Equation 4]

$$\sum_x [(x - xp)\cos\theta] h(x) \bigg/ \sum_x h(x) < \delta_1 \quad (4)$$

$\theta$ is a host vehicle azimuth angle (for example, a clockwise angle with the north (an extending direction of the lane) set to 0). A left side of Equation (4) indicates a state of variation in amount of position error. When the variation is large, the left side becomes a large value, and when the variation is small, the left side becomes a small value. When the left side is smaller than a threshold value δ1, the steady condition is satisfied. δ1 can be, for example, 0.15. As the distribution of the amount of position error, a distribution sum added in time series, for example, a distribution sum of past 10 seconds may be used.

Besides, the steady condition determination unit 14 may count the amounts of position error (x>3/4×xp) equal to or larger than 4/3 of the peak xp among the plurality of amounts of position error x, and determine that the steady condition is satisfied when a count value is smaller than a count threshold value (for example, 4). It is not necessary for the amount of position error to be 4/3, and the number of amounts of position error equal to or larger than a value obtained by multiplying the peak xp by a predetermined ratio may be counted.

When the steady condition determination unit 14 determines that the distribution of the amount of position error satisfies the steady condition, the amount-of-steady error calculation unit 15 calculates the amount of steady error from the distribution of the amount of position error. The amount of steady error is the amount of error generated steady in the vertical position of the host vehicle. The amount-of-steady error calculation unit 15 may calculate an average value or a median value of the distribution of the amount of position error determined to satisfy the steady condition as the amount of steady error or may calculate a peak value in the distribution of the amount of position error as the amount of steady error. Besides, the amount-of-steady error calculation unit 15 may input a value of the amount of position error included in the distribution of the amount of position error to a predetermined calculation equation to calculate the amount of steady error.

The amount-of-steady error calculation unit 15 calculates a reference vehicle speed, which is a vehicle speed corresponding to the amount of steady error, from the vehicle speed information (vehicle speed information at the time of calculation of the amount of position error) acquired by the amount-of-position error calculation unit 13. The vehicle speed corresponding to the amount of steady error is an average value of the vehicle speeds respectively associated with the plurality of amounts of position error included in the distribution of the amount of position error when the amount of steady error is an average value of the distribution of the amount of position error. The vehicle speed corresponding to the amount of steady error is a vehicle speed associated with the peak amount of position error when the amount of steady error is a peak value in the distribution of the amount of position error.

When the relative position of the vertical position target with respect to the host vehicle is not recognized by the target recognition unit 12, the host vehicle position estimation unit 16 estimates the vertical position of the host vehicle using the amount of steady error. The host vehicle position estimation unit 16, for example, performs estimation of the vertical position of the host vehicle using the amount of error correction obtained by multiplying the amount of steady error by the vehicle speed ratio obtained by dividing the current vehicle speed of the host vehicle by the reference vehicle speed on the basis of the detection result of the internal sensor 3. The amount of error correction can be expressed by Equation (5) below.

$$(\text{amount of error correction}) = (\text{amount of steady error}) \times (\text{current vehicle speed})/(\text{reference vehicle speed}) \quad (5)$$

The host vehicle position estimation unit 16 performs correction using the amount of error correction on the vertical position of the measured position (including estimation using the vehicle speed) acquired by the measured position acquisition unit 11 to estimate the vertical position of the host vehicle. The host vehicle position estimation unit 16, for example, corrects the vertical position of the host vehicle to a position shifted to the front of the host vehicle by the amount of error correction. The host vehicle position estimation unit 16, for example, may correct the vertical position of the host vehicle to a position shifted to the rear of the host vehicle by the amount of error correction. A direction of the correction corresponds to a deviation direction of the vertical position target in the amount of position error used for calculation of the amount of error correction.

When the relative position of the vertical position target relative to the host vehicle has been recognized by the target recognition unit 12, the host vehicle position estimation unit 16 can perform vehicle position estimation using the vertical position target. The host vehicle position estimation unit 16 estimates the host vehicle position through overlapping of the vertical position target, for example, on the basis of the position information on the vertical position target on the map and the relative position of the vertical position target. The host vehicle position estimation unit 16 may transmit the host vehicle position to the automatic driving ECU 6 such that the host vehicle position can be utilized for automatic driving of the host vehicle.

[Process of Host Vehicle Position Estimation Device]

Figure 4:
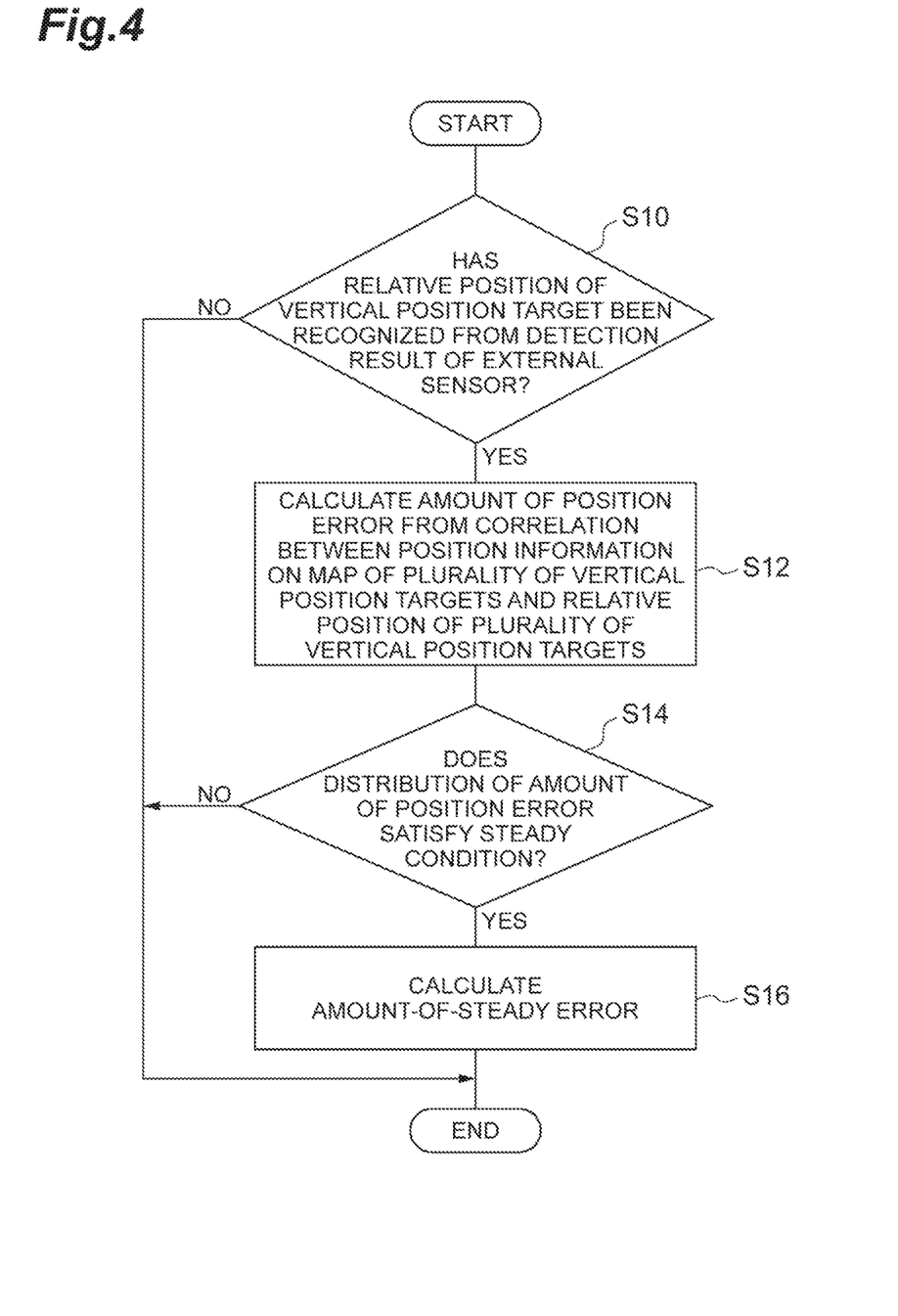
FIG. 4 is a flowchart showing an example of a process of calculating the amount of steady error.

Hereinafter, a process of the host vehicle position estimation device 100 according to the embodiment will be described with reference to the drawings. FIG. 4 is a flowchart showing an example of a process of calculating the amount of steady error. The flowchart illustrated in FIG. 4 is executed, for example, while the host vehicle is traveling.

As illustrated in FIG. 4, the host vehicle position estimation ECU 10 of the host vehicle position estimation device 100 determines whether or not a relative position of the vertical position target relative to the host vehicle has been recognized by the target recognition unit 12 in S10. The target recognition unit 12 makes a determination on the basis of a detection result of the external sensor 2. When it is not determined that the relative position of the vertical position target relative to the host vehicle has been recognized (S10: NO), the host vehicle position estimation ECU 10 ends a current process. Thereafter, the host vehicle position estimation ECU 10 repeats the processes from S10 again after a certain time has elapsed. When it is determined that the relative position of the vertical position target relative to the host vehicle has been recognized (S10: YES), the host vehicle position estimation ECU 10 proceeds to S12.

In S12, the host vehicle position estimation ECU 10 calculates the amount of position error using the amount-of-position error calculation unit 13. The amount-of-position error calculation unit 13 calculates the amount of position error on the basis of a correlation between the position information of the plurality of vertical position targets on the map and the relative position of the plurality of vertical position targets. Further, the amount-of-position error calculation unit 13 acquires the vehicle speed information of the host vehicle at the time of calculation of the amount of position error, and associates the calculated amount of position error with the vehicle speed information of the host vehicle. Thereafter, the host vehicle position estimation ECU 10 proceeds to S14.

In S14, the host vehicle position estimation ECU 10 determines whether or not a distribution of the amount of position error satisfies a preset steady condition using the steady condition determination unit 14. The steady condition determination unit 14, for example, determines whether the standard deviation in the amount of position error equal to or greater than the determination target threshold value among the amounts of position error for a plurality of times included in the distribution of the amount of position error becomes equal to or smaller than the variation threshold value, and the steady condition is satisfied. When it is determined that the steady condition is not satisfied (S14: NO), the host vehicle position estimation ECU 10 ends the current process. Thereafter, the host vehicle position estimation ECU 10 repeats the processes from S10 again after a certain time has elapsed. When it is determined that the steady condition is satisfied (S14: YES), the host vehicle position estimation ECU 10 proceeds to S16.

In S16, the host vehicle position estimation ECU 10 calculates the amount of steady error using the amount-of-steady error calculation unit 15. The amount-of-steady error calculation unit 15 calculates the amount of steady error as, for example, an average value of the distribution of the amount of position error determined to satisfy the steady condition. The amount-of-steady error calculation unit 15 calculates the reference vehicle speed which is the vehicle speed corresponding to the amount of steady error from the vehicle speed information (vehicle speed information at the time of calculation of the amount of position error) acquired by the amount-of-position error calculation unit 13. The host vehicle position estimation ECU 10 repeats the processes from S10 again after a preset standby time has elapsed.

Figure 5:
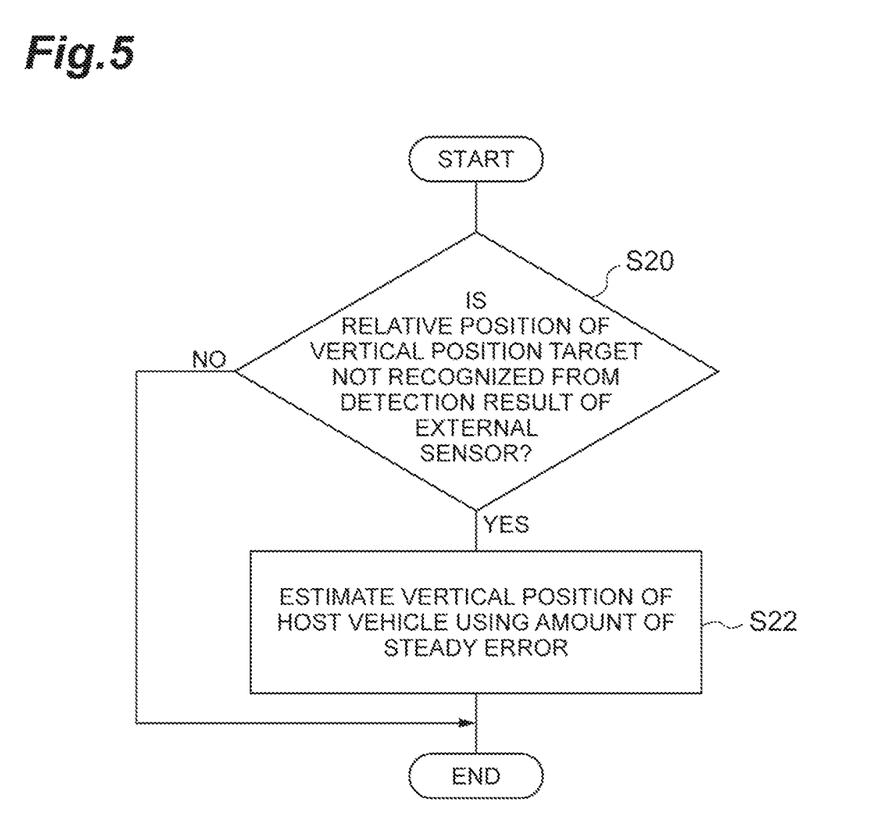
FIG. 5 is a flowchart showing an example of a vertical position estimation process.

FIG. 5 is a flowchart showing an example of the vertical position estimation process. The vertical position estimation process illustrated in FIG. 5 is executed when the amount of steady error is calculated.

As illustrated in FIG. 5, the host vehicle position estimation ECU 10 determines whether the relative position of the vertical position target relative to the host vehicle is not recognized by the target recognition unit 12 in S20. The target recognition unit 12 makes a determination on the basis of a detection result of the external sensor 2. When it is determined that the relative position of the vertical position target relative to the host vehicle has been recognized (S20: NO), the host vehicle position estimation ECU 10 ends the current process. Thereafter, the host vehicle position estimation ECU 10 repeats the processes from S20 again after a predetermined time has elapsed. When it is not determined that the relative position of the vertical position target relative to the host vehicle has been recognized (S20: YES), the host vehicle position estimation ECU 10 proceeds to S22.

In S22, the host vehicle position estimation ECU 10 estimates a vertical position of the host vehicle using the amount of steady error using the host vehicle position estimation unit 16. The host vehicle position estimation unit 16, for example, performs estimation of the vertical position of the host vehicle using the amount of error correction obtained by multiplying the amount of steady error by the vehicle speed ratio obtained by dividing the current vehicle speed of the host vehicle by the reference vehicle speed on the basis of the detection result of the internal sensor 3. The host vehicle position estimation unit 16 performs correction using the amount of error correction on the vertical position of the measured position (including estimation using the vehicle speed) acquired by the measured position acquisition unit 11 to estimate the vertical position of the host vehicle. Thereafter, the host vehicle position estimation ECU 10 ends the current process and repeats the processes from S20 again after a predetermined time has elapsed.

According to the host vehicle position estimation device 100 according to the embodiment described above, the amount of steady error generated steady in the position estimation of the host vehicle due to a sensor error or the like is obtained from the correlation between the relative position of the vertical position target and the position information on the map of the vertical position target while the relative position of a plurality of vertical position targets disposed along the extending direction of the lane can be recognized, and the amount of steady error is used for estimation of the vertical position of the host vehicle when the relative position of the vertical position target cannot be recognized. Thus, it is possible to improve the accuracy of estimation of the vertical position of the host vehicle in the section in which there is no vertical position target as compared with a case in which the amount of steady error is not used.

Further, in the host vehicle position estimation device 100, since accumulation of the vertical position error of the host vehicle is greatly affected by the vehicle speed, estimation of the vertical position of the host vehicle is performed using the amount of error correction obtained by multiplying the amount of steady error by the vehicle speed ratio obtained by dividing the current vehicle speed of the host vehicle by the reference vehicle speed. Thus, it is possible to further improve accuracy of the estimation of the vertical position of the host vehicle.

Further, the host vehicle position estimation device 100 can calculate the amount of steady error while the host vehicle is traveling in a section of the dotted lane marking line by using the dotted lane marking line as the vertical position target, and use the amount of steady error for estimation of the vertical position of the host vehicle when the host vehicle enters the section of the solid lane marking line and there is no other vertical position target. Therefore, it is possible to improve accuracy of estimation of the vertical position of the host vehicle in the section of the solid lane marking line.

Although the preferred embodiments of the present disclosure have been described above, the present disclosure is not limited to the above-described embodiments. The present disclosure can be implemented in various forms subjected to various modifications or improvements on the basis of knowledge of those skilled in the art, as well as the above-described embodiments.

The host vehicle position estimation ECU 10 of the host vehicle position estimation device 100 is not necessarily connected to the automatic driving ECU 6. The host vehicle position estimated by the host vehicle position estimation ECU 10 may be used for driving assistance control for, for example, assisting in driving of a driver or for calling attention to the driver.

When the relative position of the vertical position target relative to the host vehicle is not recognized, the host vehicle position estimation unit 16 does not necessarily need to calculate the amount of error correction using the current vehicle speed and the reference vehicle speed of the host vehicle. The host vehicle position estimation unit 16 may use the amount of steady error directly as the amount of correction to correct the vertical position of the host vehicle without considering the vehicle speed. In this case, the amount-of-position error calculation unit 13 does not have to acquire the vehicle speed information at the time of calculation of the amount of position error. In this case, the amount-of-steady error calculation unit 15 does not have to calculate the reference vehicle speed corresponding to the amount of steady error.

What is claimed is:

1. A host vehicle position estimation device that estimates a host vehicle position including a vertical position of a host vehicle, the host vehicle position estimation device comprising:
   a target database configured to store position information on a map of a plurality of vertical position targets disposed along an extending direction of a lane;
   a target recognition unit configured to recognize a relative position of the vertical position target relative to the host vehicle on the basis of a detection result of an external sensor of the host vehicle;
   an amount-of-position error calculation unit configured to calculate an amount of position error on the basis of a correlation between the position information on the map of a plurality of vertical position targets and the relative positions of the plurality of vertical position targets;
   a steady condition determination unit configured to determine whether or not a distribution of the amount of position error calculated by the amount-of-position error calculation unit satisfies a preset steady condition;
   an amount-of-steady error calculation unit configured to calculate an amount of steady error from the distribution of the amount of position error when the steady condition determination unit determines that the distribution of the amount of position error satisfies the steady condition; and
   a host vehicle position estimation unit configured to perform estimation of the vertical position of the host vehicle using the amount of steady error when the relative position of the vertical position target relative to the host vehicle is not recognized by the target recognition unit.

2. The host vehicle position estimation device according to claim 1,
   wherein the amount-of-position error calculation unit acquires vehicle speed information of the host vehicle at the time of calculation of the amount of position error,
   the amount-of-steady error calculation unit calculates a reference vehicle speed, which is a vehicle speed corresponding to the amount of steady error, from the vehicle speed information acquired by the amount-of-position error calculation unit, and
   when the relative position of the vertical position target relative to the host vehicle is not recognized by the target recognition unit, the host vehicle position estimation unit performs estimation of the vertical position of the host vehicle using an amount of error correction obtained by multiplying the amount of steady error by a vehicle speed ratio obtained by dividing a current vehicle speed of the host vehicle by the reference vehicle speed.

3. The host vehicle position estimation device according to claim 1, wherein the vertical position target is a line segment of a dotted lane marking line.

4. The host vehicle position estimation device according to claim 2, wherein the vertical position target is a line segment of a dotted lane marking line.

* * * * *